United States Patent
Corsaro et al.

(10) Patent No.: US 12,187,836 B2
(45) Date of Patent: Jan. 7, 2025

(54) TWO-COMPONENT POLYURETHANE CASTING COMPOUND WITH ADJUSTABLE POT LIFE

(71) Applicant: SIKA TECHNOLOGY AG, Baar (CH)

(72) Inventors: Antonio Corsaro, Regensdorf (CH); Fabien Choffat, Rüttenen (CH)

(73) Assignee: SIKA TECHNOLOGY AG, Baar (CH)

( * ) Notice: Subject to any disclaimer, the term of this patent is extended or adjusted under 35 U.S.C. 154(b) by 719 days.

(21) Appl. No.: 17/312,112

(22) PCT Filed: Dec. 18, 2019

(86) PCT No.: PCT/EP2019/085952
§ 371 (c)(1),
(2) Date: Jun. 9, 2021

(87) PCT Pub. No.: WO2020/127485
PCT Pub. Date: Jun. 25, 2020

(65) Prior Publication Data
US 2022/0025101 A1 Jan. 27, 2022

(30) Foreign Application Priority Data
Dec. 21, 2018 (EP) .................................... 18215604

(51) Int. Cl.
C08G 18/22 (2006.01)
C08G 18/24 (2006.01)
C08G 18/32 (2006.01)
C08G 18/38 (2006.01)
C08G 18/48 (2006.01)
C08G 18/76 (2006.01)

(52) U.S. Cl.
CPC .......... *C08G 18/227* (2013.01); *C08G 18/24* (2013.01); *C08G 18/3206* (2013.01); *C08G 18/3876* (2013.01); *C08G 18/4812* (2013.01); *C08G 18/4825* (2013.01); *C08G 18/485* (2013.01); *C08G 18/7657* (2013.01)

(58) Field of Classification Search
CPC .. C08G 18/227; C08G 18/24; C08G 18/3206; C08G 18/4812; C08G 18/4825; C08G 18/485; C08G 18/7657
See application file for complete search history.

(56) References Cited

U.S. PATENT DOCUMENTS

2011/0281966 A1* 11/2011 Greszta-Franz ..... C08G 18/792
524/871
2015/0259465 A1* 9/2015 Burckhardt .......... C04B 40/065
524/839

FOREIGN PATENT DOCUMENTS

| CN | 1171123 A | 1/1998 |
| EP | 0800544 B1 | 9/1998 |
| EP | 2436713 A1 | 4/2012 |
| WO | 96/20967 A1 | 7/1996 |

OTHER PUBLICATIONS

Jun. 16, 2021 International Preliminary Report on Patentability issued in International Patent Application No. PCT/EP2019/085952.
Feb. 24, 2020 Search Report issued in International Patent Application No. PCT/EP2019/085952.

* cited by examiner

*Primary Examiner* — Ling Siu Cho
*Assistant Examiner* — Andrea Wu
(74) *Attorney, Agent, or Firm* — Oliff PLC

(57) ABSTRACT

A polyurethane composition consisting of a first component and a second component, wherein the first component contains a polyol having an OH functionality in the range from 1.5 to 4 and an average molecular weight in the range from 250 to 15 000 g/mol, a diol having two hydroxyl groups joined via a C2 to C9 carbon chain, and a compound having at least one thiol group. In addition, one of the two components additionally contains at least one metal catalyst for the reaction of hydroxyl groups and isocyanate groups that is able to form thio complexes, and the molar ratio of all NCO groups in the polyisocyanurates to all OH groups in the polyols is 0.9:1-1.2:1, and the polyurethane composition, directly after mixing of the components at 23° C., is free-flowing, and has a viscosity of <5000 Pa·s at a shear rate of $0.01\ s^{-1}$.

15 Claims, No Drawings

TWO-COMPONENT POLYURETHANE CASTING COMPOUND WITH ADJUSTABLE POT LIFE

TECHNICAL FIELD

The invention relates to the field of low-viscosity two-component polyurethane compositions and to the use thereof as casting compounds, and to a method of filling cavities, joins or gaps with such a polyurethane composition.

STATE OF THE ART

Two-component polyurethane compositions based on polyols and polyisocyanates have already been used for some time. Two-component polyurethane compositions have the advantage over one-component compositions that they cure rapidly after mixing and can therefore absorb and transmit higher forces after just a short time. In addition, they are not dependent on external curing factors such as air humidity and supply of heat, and can thus cure homogeneously and rapidly at room temperature even in large layers or volumes. For instance, two-component polyurethane compositions have also long been used successfully as casting compounds. Casting compounds find various uses in industry and for repair purposes, for example as insulating electrical potting compounds in the production of electrical and electronic components or for underground electrical wires, or as casting compounds for building and repair purposes, for example in the repair of rails. Especially in the case of casting compounds for repair purposes in road and rail transit, however, specific demands have to be met. Firstly, the casting compounds must provide mechanically demanding performance levels while achieving sufficient deadening of sound and damping of vibration. For this purpose, there are already some casting compounds of this kind on the market, usually based on polyurethane, polyurea, silicone or epoxide compositions. These are capable of meeting the requisite mechanical demands in order to be usable as long-life, elastic filling compounds having high moduli and low glass transition temperatures. On the other hand, however, it is always necessary to enter into compromises with two-component casting compounds. For use of two-component polyurethane compositions as casting compounds, it would generally be desirable to be able to combine a sufficiently long processing time (pot life) of the mixed composition without an excessively rapid rise in viscosity as a result of the commencement of curing, but with subsequently very rapid curing after processing and extremely rapid development of strength. However, this is barely achievable with customary two-component compositions. Either the pot life is very short in the case of compositions that cure rapidly and develop strength quickly, or else curing and hardening are slow when processing compositions that have a long pot life. This is a problem specifically in the case of casting compounds for repair in the transit sector, for example in the case of tram rails. In that case, often relatively large cavities and/or extensive regions are filled by casting, and the pot life must be long enough for the purpose. At the same time, the repair works, which usually take place at night, should be concluded as quickly as possible, and the repaired region, for example the tram rail repaired by casting, should be opened up to transit again as quickly as possible. However, this is only possible when the casting compound applied has already cured to such a degree that it can be subjected to high load. Two-component polyurethane compositions that are standard nowadays for this field of use are usually formulated in a complex manner, for example by use of specific, retarded polyamine crosslinkers, in order to meet these demands as well as possible. However, this is possible only to a satisfactory degree. Although controllability of the pot life of such compositions is relatively good, the rise in viscosity during the pot life is not inconsiderable, and the wait time before the cast composition has attained sufficiently high strength is at least a few hours up to one day. Moreover, the polyamine crosslinkers mentioned are often potentially harmful to health and hazardous to waters. There is therefore a desire for casting compounds based on two-component polyurethane compositions which do not contain any amine crosslinkers that are potentially harmful to health and which have excellent mechanical properties and which cure very rapidly after application and, within a very short time, for example not more than a few hours, have such high strength and moduli that they, for example in the case of casting compounds for repair in road and railway traffic, are ready to be cleared for use of the roads and rails. However, they also need to have a sufficiently long pot life without a noticeable rise in viscosity in order to enable processing of relatively large structural or manufacturing components as well. It would additionally be desirable that the pot life of such compositions can be tailored to the desired use.

SUMMARY OF THE INVENTION

It is therefore an object of the present invention to provide a casting compound based on a two-component polyurethane composition that cures very rapidly to form a mechanically excellent compound suitable as repair compound or electrical insulation, but at the same time has a sufficiently long pot life adjustable within certain limits, allowing it to be processed without difficulty.

This object is surprisingly achieved with the polyurethane composition according to the invention as claimed in claim 1. The composition comprises a polyol, a short-chain diol, and also a compound having at least one thiol group in the first component and a high content of polyisocyanate in the second component. For curing the composition, the composition further contains a metal catalyst that is able to form thio complexes, with the ratio of thiol groups to metal atoms in the composition being fixed. The composition has very high strength and good elasticity when cured. After mixing the components and after an adequately long pot life that can be adjusted within certain limits, it cures very rapidly and achieves very good mechanical values after just a short time, for example a few hours to one day.

Further aspects of the invention are the subject of further independent claims. Particularly preferred embodiments of the invention are the subject of the dependent claims.

Ways of Executing the Invention

The present invention relates to a polyurethane composition consisting of a first and a second component; wherein the first component A comprises
- at least one polyol A1 having an OH functionality in the range from 1.5 to 4 and a mean molecular weight in the range from 250 to 15 000 g/mol, and
- at least one diol A2 having two hydroxyl groups that are linked via a C2 to C9 carbon chain, and
- at least one compound T that has at least one thiol group; and the second component B comprises
at least one polyisocyanate I;
wherein one of the components additionally comprises at least one metal catalyst K for the reaction of hydroxyl groups and isocyanate groups that is able to form thio complexes;
and wherein the molar ratio of all the thiol groups in the at least one compound T to all metal atoms in the at least one metal catalyst K is between 1:1 and 250:1;
and wherein the molar ratio of all NCO groups in the polyisocyanates I to all OH groups in the polyols A1 and A2=0.9:1-1.2:1, especially 1.0:1-1.1:1; and wherein the polyurethane composition, directly after mixing of components A and B at 23° C., is free-flowing, preferably self-leveling, and has a viscosity, measured at 20° C. on a plate-plate viscometer with plate separation 1 mm and plate diameter 25 mm, of <5000 Pa·s at a shear rate of 0.01 s$^{-1}$, of <500 Pa·s at a shear rate of 1 s$^{-1}$, and of <50 Pa·s at a shear rate of 10 s$^{-1}$.

The prefix "poly" in substance names such as "polyol", "polyisocyanate", "polyether" or "polyamine" in the present document indicates that the respective substance formally contains more than one of the functional group that occurs in its name per molecule.

In the present document the term "polymer" firstly encompasses a collective of macromolecules that are chemically uniform but differ in the degree of polymerization, molar mass, and chain length, said collective having been produced by a "poly" reaction (polymerization, polyaddition, polycondensation). The term secondly also encompasses derivatives of such a collective of macromolecules from "poly" reactions, i.e. compounds that have been obtained by reactions, for example additions or substitutions, of functional groups on defined macromolecules and that may be chemically uniform or chemically nonuniform. The term further encompasses so-called prepolymers too, i.e. reactive oligomeric initial adducts, the functional groups of which are involved in the formation of macromolecules.

The term "polyurethane polymer" encompasses all polymers produced according to the so-called diisocyanate polyaddition process. This also includes polymers that are virtually or completely free of urethane groups. Examples of polyurethane polymers are polyether polyurethanes, polyester polyurethanes, polyether polyureas, polyureas, polyester polyureas, polyisocyanurates, and polycarbodiimides.

In the present document, "molecular weight" is understood to mean the molar mass (in grams per mole) of a molecule or a molecule residue. "Average molecular weight" refers to the number average $M_n$ of a polydisperse mixture of oligomeric or polymeric molecules or molecule residues, which is typically determined by gel-permeation chromatography (GPC) against polystyrene as standard. In the present document, "room temperature" refers to a temperature of 23° C. Percent by weight values, abbreviated to % by weight, refer to the proportions by mass of a constituent in a composition based on the overall composition, unless otherwise stated. The terms "mass" and "weight" are used synonymously in the present document.

A "primary hydroxyl group" refers to an OH group attached to a carbon atom having two hydrogens.

In this document, the "pot life" refers to the time within which, after mixing the two components, the polyurethane composition can be processed before the viscosity resulting from the progression of the crosslinking reaction has become too high for further processing.

The term "strength" in the present document refers to the strength of the cured composition, with strength meaning in particular the tensile strength and modulus of elasticity, particularly within the 0.05% to 0.25% region of elongation.

In the present document, "room temperature" refers to a temperature of 23° C.

A substance or a composition is described as "storage-stable" or "storable" if it can be stored at room temperature in a suitable container over a prolonged period, typically for at least 3 months up to 6 months or more, without this storage resulting in any change in its application or use properties, particularly in the viscosity and crosslinking rate, to an extent relevant to the use thereof.

All industry standards and norms mentioned in this document relate to the versions valid at the date of first filing.

The first component A comprises firstly at least one polyol A1 having an OH functionality in the range from 1.5 to 4 and an average molecular weight in the range from 250 to 15 000 g/mol.

Suitable polyols A1 are in principle all polyols currently used in the production of polyurethane polymers. Particularly suitable are polyether polyols, polyester polyols, poly (meth)acrylate polyols, polybutadiene polyols, polycarbonate polyols, and also mixtures of these polyols.

Suitable polyether polyols, also known as polyoxyalkylene polyols or oligoetherols, are in particular those that are polymerization products of ethylene oxide, 1,2-propylene oxide, 1,2- or 2,3-butylene oxide, oxetane, tetrahydrofuran or mixtures thereof, optionally polymerized with the aid of a starter molecule having two or more active hydrogen atoms such as water, ammonia or compounds having a plurality of OH or NH groups, for example ethane-1,2-diol, propane-1,2-diol and -1,3-diol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, cyclohexane-1,3-dimethanol and -1,4-dimethanol, bisphenol A, hydrogenated bisphenol A, 1,1,1-trimethylolethane, 1,1,1-trimethylolpropane, glycerol, aniline, and also mixtures of the recited compounds. It is possible to use either polyoxyalkylene polyols having a low degree of unsaturation (measured in accordance with ASTM D-2849-69 and expressed in milliequivalents of unsaturation per gram of polyol (meq/g)), produced for example using so-called double metal cyanide complex catalysts (DMC catalysts), or polyoxyalkylene polyols having a relatively high degree of unsaturation, produced for example using anionic catalysts such as NaOH, KOH, CsOH or alkali metal alkoxides. Particularly suitable are polyoxyethylene polyols and polyoxypropylene polyols, in particular polyoxyethylene diols, polyoxypropylene diols, polyoxyethylene triols, and polyoxypropylene triols.

Especially suitable are polyoxyalkylene diols or polyoxyalkylene triols having a degree of unsaturation lower than 0.02 meq/g and having a molecular weight within a range from 1000 to 15 000 g/mol, as are polyoxyethylene diols, polyoxyethylene triols, polyoxypropylene diols, and polyoxypropylene triols having a molecular weight of 400 to 15 000 g/mol.

Likewise particularly suitable are so-called ethylene oxide-terminated ("EO-endcapped", ethylene oxide-endcapped) polyoxypropylene polyols. The latter are special polyoxypropylene polyoxyethylene polyols that are obtained for example when pure polyoxypropylene polyols, in particular polyoxypropylene diols and triols, are at the end of the polypropoxylation reaction further alkoxylated with ethylene oxide and thus have primary hydroxyl groups.

Preference in this case is given to polyoxypropylene polyoxyethylene diols and polyoxypropylene polyoxyethylene triols.

Also suitable are hydroxyl-terminated polybutadiene polyols, for example those produced by polymerization of 1,3-butadiene and allyl alcohol or by oxidation of polybutadiene and also the hydrogenation products thereof.

Also suitable are styrene-acrylonitrile grafted polyether polyols such as those commercially available for example under the trade name Lupranol® from Elastogran GmbH, Germany.

Suitable polyester polyols include in particular polyesters that bear at least two hydroxyl groups and are produced by known processes, in particular polycondensation of hydroxycarboxylic acids or polycondensation of aliphatic and/or aromatic polycarboxylic acids with dihydric or polyhydric alcohols. Especially suitable are polyester polyols produced from dihydric to trihydric alcohols such as ethane-1,2-diol, diethylene glycol, propane-1,2-diol, dipropylene glycol, butane-1,4-diol, pentane-1,5-diol, hexane-1,6-diol, neopentyl glycol, glycerol, 1,1,1-trimethylolpropane or mixtures of the abovementioned alcohols with organic dicarboxylic acids or the anhydrides or esters thereof, for example succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride or mixtures of the abovementioned acids, as are polyester polyols formed from lactones such as ε-caprolactone.

Particularly suitable are polyester diols, in particular those produced from adipic acid, azelaic acid, sebacic acid, dodecanedicarboxylic acid, dimer fatty acid, phthalic acid, isophthalic acid and terephthalic acid as the dicarboxylic acid or from lactones such as ε-caprolactone and from ethylene glycol, diethylene glycol, neopentyl glycol, butane-1,4-diol, hexane-1,6-diol, dimer fatty acid diol, and cyclohexane-1,4-dimethanol as the dihydric alcohol.

Suitable polycarbonate polyols include in particular those obtainable by reaction for example of the abovementioned alcohols used to form the polyester polyols with dialkyl carbonates such as dimethyl carbonate, diaryl carbonates such as diphenyl carbonate, or phosgene. Likewise suitable are polycarbonates obtainable from the copolymerization of $CO_2$ with epoxides such as ethylene oxide and propylene oxide. Polycarbonate diols, in particular amorphous polycarbonate diols, are particularly suitable.

Further suitable polyols are poly(meth)acrylate polyols.

Also suitable are polyhydroxy-functional fats and oils, for example natural fats and oils, in particular castor oil, or so-called oleochemical polyols obtained by chemical modification of natural fats and oils, the epoxy polyesters or epoxy polyethers obtained for example by epoxidation of unsaturated oils and subsequent ring opening with carboxylic acids or alcohols respectively, or polyols obtained by hydroformylation and hydrogenation of unsaturated oils. Also suitable are polyols obtained from natural fats and oils by degradation processes such as alcoholysis or ozonolysis and subsequent chemical linking, for example by transesterification or dimerization, of the thus obtained degradation products or derivatives thereof. Suitable degradation products of natural fats and oils are in particular fatty acids and fatty alcohols and also fatty acid esters, in particular the methyl esters (FAME), which can be derivatized to hydroxy fatty acid esters, for example by hydroformylation and hydrogenation.

Likewise suitable are, in addition, polyhydrocarbon polyols, also referred to as oligohydrocarbonols, for example polyhydroxy-functional ethylene-propylene, ethylene-butylene or ethylene-propylene-diene copolymers, for example those produced by Kraton Polymers, USA, or polyhydroxy-functional copolymers of dienes, such as 1,3-butadiene or diene mixtures, and vinyl monomers such as styrene, acrylonitrile or isobutylene, or polyhydroxy-functional polybutadiene polyols, for example those which are produced by copolymerization of 1,3-butadiene and allyl alcohol and which may also be hydrogenated.

Also suitable are polyhydroxy-functional acrylonitrile/butadiene copolymers, such as those that can be produced from epoxides or amino alcohols and carboxyl-terminated acrylonitrile/butadiene copolymers, which are commercially available under the name Hypro® (formerly Hycar®) CTBN from Emerald Performance Materials, LLC, USA.

All the recited polyols have an average molecular weight from 250 to 15 000 g/mol, in particular from 400 to 10 000 g/mol, preferably from 1000 to 8000 g/mol, and an average OH functionality in the range from 1.5 to 4, preferably 1.7 to 3. However, it is entirely possible for the composition to also include proportions of monools (polymers having only one hydroxyl group).

Particularly suitable polyols are polyester polyols and polyether polyols, in particular polyoxyethylene polyol, polyoxypropylene polyol, and polyoxypropylene polyoxyethylene polyol, preferably polyoxyethylene diol, polyoxypropylene diol, polyoxyethylene triol, polyoxypropylene triol, polyoxypropylene polyoxyethylene diol, and polyoxypropylene polyoxyethylene triol.

The first component A further comprises at least one diol A2 having two hydroxyl groups that are linked via a C2 to C9 carbon chain.

Suitable as diol A2 are linear or branched alkylene diols having two primary or secondary hydroxyl groups, alkylene diols having one primary and one secondary hydroxyl group, and cycloaliphatic diols.

The diol A2 is preferably a linear aliphatic diol having two primary hydroxyl groups that are linked via a C4 to C9 carbon chain. Such a diol has the advantage of yielding polyurethanes having particularly high moduli of elasticity in the region of low elongation, for example between 0 and 5%, which is advantageous for structural adhesives in particular.

In particular, the diol A2 is selected from the group consisting of ethylene glycol, propane-1,3-diol, butane-1,4-diol, pentane-1,5-diol, hexane-1,6-diol, heptane-1,7-diol, octane-1,8-diol, nonane-1,9-diol, butane-1,3-diol, butane-2,3-diol, 2-methylpropane-1,3-diol, pentane-1,2-diol, pentane-2,4-diol, 2-methylbutane-1,4-diol, 2,2-dimethylpropane-1,3-diol (neopentyl glycol), hexane-1,2-diol, butane-1,4-diol, 3-methylpentane-1,5-diol, octane-1,2-diol, octane-3,6-diol, 2-ethylhexane-1,3-diol, 2,2,4-trimethylpentane-1,3-diol, 2-butyl-2-ethylpropane-1,3-diol, 2,7-dimethyloctane-3,6-diol, cyclohexane-1,4-diol, cyclohexane-1,3-dimethanol and cyclohexane-1,4-dimethanol.

The diol A2 is particularly preferably selected from the group consisting of butane-1,4-diol, pentane-1,5-diol, hexane-1,6-diol, heptane-1,7-diol, octane-1,8-diol and nonane-1,9-diol.

The diol A2 is most preferably selected from the group consisting of butane-1,4-diol, pentane-1,5-diol, hexane-1,6-diol and nonane-1,9-diol. These diols are commercially readily available and provide polyurethanes having particularly high moduli of elasticity at low elongation when cured.

The first component A preferably comprises between 5 and 25% by weight, in particular 10 to 15% by weight, of diol A2.

In addition to these recited polyols A1 and A2, it is possible to include small amounts of further low-molecular-weight dihydric or polyhydric alcohols such as diethylene glycol, triethylene glycol, the isomeric dipropylene glycols and tripropylene glycols, the isomeric decanediols and undecanediols, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low-molecular-weight alkoxylation products of the abovementioned dihydric and polyhydric alcohols, and also mixtures of the abovementioned alcohols. In addition, polyols containing other heteroatoms, for example methyldiethanolamine or thiodiglycol, may also be included.

The first component A further comprises at least one compound T that has at least one thiol group. Suitable are all compounds that have at least one thiol or mercapto group and that can be formulated into the composition according to the invention. A thiol group is understood here as meaning an —SH group that is attached to an organic radical, for example an aliphatic, cycloaliphatic or aromatic carbon radical.

Preference is given to compounds having 1 to 6, in particular 1 to 4, most preferably 1 or 2 thiol groups. Compounds having a thiol group have the advantage that they do not form complexes with the metal catalyst K, which tend to be poorly soluble, and that the pot life can be adjusted particularly precisely. Compounds having two thiol groups have the advantage that the mechanical properties of the composition after curing are improved.

Examples of suitable compounds T having a thiol group are 3-mercaptopropyltrimethoxysilane, 3-mercaptopropyl-triethoxysilane, 3-mercaptopropane-1,2-diol, 2-mercapto-toluimidazole or 2-mercaptobenzothiazole.

Examples of suitable compounds T having more than one thiol group are ethylene glycol di(3-mercaptopropionate), ethylene glycol dimercaptoacetate, dipentaerythritol hexa(3-mercaptopropionate), 2,3-dimercapto-1,3,4-thiadiazole or pentaerythritol tetrakis(3-mercaptopropionate).

The compound T is preferably selected from the group consisting of ethylene glycol di(3-mercaptopropionate), ethylene glycol dimercaptoacetate, dipentaerythritol hexa(3-mercaptopropionate), and 3-mercaptopropyl trimethoxysilane.

The molar ratio of all the thiol groups in the at least one compound T to all metal atoms in the at least one metal catalyst K must be between 1:1 and 250:1. It is preferably between 2:1 and 150:1, in particular between 5:1 and 100:1. This quantitative ratio allows the pot life to be adjusted, specifically within the intrinsic limits of the particular composition, through, for example, the content of catalyst, the reactivity of the isocyanates present, and the amount thereof. The lower limit of the pot life is the pot life that is obtained in a given composition when using a defined amount of catalyst without addition of compound T. In many situations suitable for use according to the invention as a structural adhesive or composite material matrix and as a consequence of the large number of isocyanate groups in the presence of a catalyst but without compound T, no effective pot life is achieved, and the composition starts to cure almost immediately on mixing the two components.

The upper limit of the adjustable pot life is accordingly the pot life that would be achieved through the uncatalyzed isocyanate-hydroxyl reaction if a catalyst is not used. Even without the use of a catalyst, this reaction will commence at some point after mixing the two components. However, the reaction without catalyst proceeds more slowly and with the development of poorer mechanical properties in the cured material.

The key advantage achieved by the two-component polyurethane composition according to the invention is a system that cures and hardens with extraordinary rapidity, while at the same time having an adequately long pot life that allows it to be processed in a user-friendly manner. This means, for example, that structural bonding may be carried out on relatively large substrates too, which can be subjected to mechanical stress just a very short time after application of the adhesive. This results, for example, in a significant shortening of throughput times in industrial production. A further advantage of the polyurethane compositions according to the invention is the possibility of being able to adjust the pot life as described above. This is very advantageous particularly in automated applications and can, for example, allow further optimization of throughput times in industrial production, since the pot life can be tailored to the desired use.

The second component B comprises firstly at least one polyisocyanate I.

The polyisocyanate I is present in relatively high amounts, which is very advantageous for the development of mechanical properties that are good enough for use as a structural adhesive or matrix for composite materials.

The second component contains sufficient polyisocyanate I for it to comprise at least 5% by weight, in particular at least 6% by weight, preferably at least 7.5% by weight of isocyanate groups based on the overall polyurethane composition.

All commercially available polyisocyanates suitable for polyurethane production, in particular diisocyanates, may be used as polyisocyanates I for the production of the polyurethane polymer in the composition according to the invention.

Suitable polyisocyanates are in particular monomeric di- or triisocyanates and also oligomers, polymers, and derivatives of monomeric di- or triisocyanates, and any mixtures thereof.

Suitable aromatic monomeric di- or triisocyanates are in particular tolylene 2,4- and 2,6-diisocyanate and any mixtures of these isomers (TDI), diphenylmethane 4,4'-, 2,4'-, and 2,2'-diisocyanate and any mixtures of these isomers (MDI), mixtures of MDI and MDI homologs (polymeric MDI or PMDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), dianisidine diisocyanate (DADI), 1,3,5-tris(isocyanatomethyl)benzene, tris(4-isocyanatophenyl)methane, and tris(4-isocyanatophenyl)thiophosphate.

Suitable aliphatic monomeric di- or triisocyanates are in particular tetramethylene 1,4-diisocyanate, 2-methylpentamethylene 1,5-diisocyanate, hexamethylene 1,6-diisocyanate (HDI), 2,2,4- and 2,4,4-trimethylhexamethylene 1,6-diisocyanate (TMDI), decamethylene 1,10-diisocyanate, dodecamethylene 1,12-diisocyanate, lysine diisocyanate and lysine ester diisocyanate, cyclohexane 1,3- and 1,4-diisocyanate, 1-methyl-2,4- and -2,6-diisocyanatocyclohexane and any mixtures of these isomers (HTDI or $H_6$TDI), 1-isocyanato-3,3,5-trimethyl-5-isocyanatomethylcyclohexane (=isophorone diisocyanate or IPDI), perhydrodiphenylmethane 2,4'- and 4,4'-diisocyanate (HMDI or $H_{12}$MDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethylxylylene 1,3- and 1,4-diisocyanate (m- and p-TMXDI), bis(1-isocyanato-1-methylethyl)naphthalene, dimer and trimer fatty acid isocyanates such as 3,6-bis(9-isocyanatononyl)-4,5-di-(1-heptenyl)cyclohexene (dimeryl diisocyanate), and $\alpha,\alpha,\alpha',\alpha',\alpha'',\alpha''$-hexamethyl-1,3,5-mesitylene triisocyanate.

Preference among these is given to MDI, TDI, HDI, and IPDI.

Suitable oligomers, polymers, and derivatives of the monomeric di- and triisocyanates mentioned are especially those derived from MDI, TDI, HDI, and IPDI. Particularly suitable among these are commercially available types, in particular HDI biurets such as Desmodur® N 100 and N 3200 (from Covestro), Tolonate® HDB and HDB-LV (from Vencorex), and Duranate® 24A-100 (from Asahi Kasei); HDI isocyanurates such as Desmodur® N 3300, N 3600, and N 3790 BA (all from Covestro), Tolonate® HDT, HDT-LV, and HDT-LV2 (from Vencorex), Duranate® TPA-100 and THA-100 (from Asahi Kasei), and Coronate® HX (from Nippon Polyurethane); HDI uretdiones such as Desmodur® N 3400 (from Covestro); HDI iminooxadiazinediones such as Desmodur® XP 2410 (from Covestro); HDI allophanates such as Desmodur® VP LS 2102 (from Covestro); IPDI isocyanurates, for example in solution as Desmodur® Z 4470 (from Covestro) or in solid form as Vestanat® T1890/100 (from Evonik); TDI oligomers such as Desmodur® IL (from Covestro); and also mixed isocyanurates based on TDI/HDI, for example as Desmodur® HL (from Covestro). Also particularly suitable are MDI forms that are liquid at room temperature (so-called "modified MDI"), which are mixtures of MDI with MDI derivatives such as, in particular, MDI carbodiimides or MDI uretonimines or MDI urethanes, known by trade names such as Desmodur® CD, Desmodur® PF, Desmodur® PC (all from Covestro) or Isonate® M 143 (from Dow), and mixtures of MDI and MDI homologs (polymeric MDI or PMDI), available under trade names such as Desmodur® VL, Desmodur® VL50, Desmodur® VL R10, Desmodur® VL R20, Desmodur® VH 20 N, and Desmodur® VKS 20F (all from Covestro), Isonate® M 309, Voranate® M 229 and Voranate® M 580 (all from Dow) or Lupranat® M 10 R (from BASF). The abovementioned oligomeric polyisocyanates are in practice typically mixtures of substances having different degrees of oligomerization and/or chemical structures. They preferably have an average NCO functionality of 2.1 to 4.0.

The polyisocyanate is preferably selected from the group consisting of MDI, TDI, HDI, and IPDI, and oligomers, polymers, and derivatives of the recited isocyanates, and mixtures thereof.

The polyisocyanate preferably contains isocyanurate, iminooxadiazinedione, uretdione, biuret, allophanate, carbodiimide, uretonimine or oxadiazinetrione groups.

Particularly preferred polyisocyanates are MDI forms that are liquid at room temperature. These are especially what are called polymeric MDI, and MDI having fractions of oligomers or derivatives thereof. The content of MDI (=diphenylmethane 4,4'-, 2,4'- or 2,2'-diisocyanate and any mixtures of these isomers) in such liquid MDI forms is in particular 50 to 95% by weight, in particular 60 to 90% by weight.

Particularly preferred as the polyisocyanate is polymeric MDI and MDI types that are liquid at room temperature and contain proportions of MDI carbodiimides or their adducts.

With these polyisocyanates, particularly good processing properties and particularly high strengths are obtained.

The polyisocyanate of the second component may contain proportions of polyurethane polymers having isocyanate groups. Either the second component may comprise a polyurethane polymer having isocyanate groups that was produced separately, or the polyisocyanate has been mixed with at least one polyol, in particular a polyether polyol, with the isocyanate groups being present in a stoichiometric excess over the OH groups.

In the composition according to the invention, polyisocyanate I is preferably present in an amount from 10% by weight to 35% by weight, in particular from 15% by weight to 30% by weight, particularly preferably from 20% by weight to 25% by weight, based on the overall composition.

The first component A and/or the second component B further comprises at least one metal catalyst K for the reaction of hydroxyl groups and isocyanate groups that is able to form thio complexes. Suitable metal catalysts K are thus all metal catalysts that may be used as a crosslinking catalyst in polyurethane chemistry and that can at the same time form thio complexes with thiols in the presence thereof.

The metal catalyst K is preferably present only in the first component A. This has the advantage of achieving better storage stability.

Examples of suitable metal catalysts are bismuth, zinc, tin or zirconium compounds, including complexes and salts of these metals.

The metal catalyst K preferably comprises a bismuth compound, in particular a bismuth(III) compound. In addition to the desired properties as a catalyst able to form thio complexes, a bismuth compound has the advantage of low acute toxicity.

A multiplicity of conventional bismuth catalysts may be used as the bismuth compound. Examples are bismuth carboxylates, for example bismuth acetate, oleate, octoate or neodecanoate, bismuth nitrate, bismuth halides such as the bromide, chloride, or iodide, bismuth sulfide, basic bismuth carboxylates such as bismuthyl neodecanoate, bismuth subgallate or bismuth subsalicylate, and mixtures thereof.

In a preferred embodiment, the metal catalyst K is a bismuth(III) complex containing at least one ligand based on 8-hydroxyquinoline. Such complexes are described in EP 1551895. This is preferably a bismuth(III) carboxylate containing one molar equivalent of an 8-hydroxyquinoline ligand.

In a further preferred embodiment, the metal catalyst K is a bismuth(III) complex containing at least one ligand based on a 1,3-ketoamide. Such complexes are described in EP 2791153. This is preferably a bismuth(III) carboxylate containing 1 to 3 molar equivalents of a 1,3-ketoamide ligand.

The polyurethane composition may contain, in addition to the constituents already mentioned, further constituents as known to the person skilled in the art from two-component polyurethane chemistry. These may be present in just one component or in both.

Preferred further constituents are inorganic or organic fillers, such as, in particular, natural, ground or precipitated calcium carbonates, optionally coated with fatty acids, in particular stearic acid, baryte (heavy spar), talcs, quartz powders, quartz sand, dolomites, wollastonites, kaolins, calcined kaolins, mica (potassium aluminum silicate), molecular sieves, aluminum oxides, aluminum hydroxides, magnesium hydroxide, silicas including finely divided silicas from pyrolysis processes, industrially produced carbon blacks, graphite, metal powders such as aluminum, copper, iron, silver or steel, PVC powder or hollow spheres, and also flame-retardant fillers such as hydroxides or hydrates, in particular hydroxides or hydrates of aluminum, preferably aluminum hydroxide.

The addition of fillers is advantageous in that it increases the strength of the cured polyurethane composition.

The polyurethane composition preferably comprises at least one filler selected from the group consisting of calcium carbonate, carbon black, kaolin, baryte, talc, quartz powder, dolomite, wollastonite, kaolin, calcined kaolin, and mica. Particularly preferred as fillers are ground calcium carbonates, calcined kaolins or carbon black.

It may be advantageous to use a mixture of different fillers. Most preferred are combinations of ground calcium carbonates or calcined kaolins and carbon black.

The content of filler F in the composition is preferably in the range from 5% by weight to 50% by weight, in particular 10% by weight to 40% by weight, particularly preferably 15% by weight to 30% by weight, based on the overall composition.

It is possible for further constituents to be additionally present, in particular solvents, plasticizers and/or extenders, pigments, rheology modifiers such as, in particular, amorphous silicas, desiccants such as, in particular, zeolites, adhesion promoters such as, in particular, organofunctional trialkoxysilanes, stabilizers against oxidation, heat, light, and UV radiation, flame-retardant substances, and also surface-active substances, in particular wetting agents and defoamers.

The polyurethane composition comprises preferably less than 0.5% by weight, in particular less than 0.1% by weight of carboxylic acids, based on the overall composition. Any carboxylate ligands introduced through the metal catalyst are not included here among the stated carboxylic acids.

A preferred polyurethane composition comprises a first component A comprising
- 30% to 90% by weight, preferably 40% to 80% by weight, in particular 50% to 70% by weight, of polyol A1,
- 5% to 25% by weight, preferably 10% to 20% by weight, in particular 12% to 18% by weight, of diol A2,
- 1% to 5% by weight, preferably 1.25% to 3% by weight, in particular 1.5% to 2% by weight, of a compound T having at least one thiol group,
- 0.05% to 0.5% by weight, preferably 0.1% to 0.3% by weight, in particular 0.15% to 0.2% by weight, of a metal catalyst K, and
- 10% to 50% by weight, preferably 15% to 40% by weight, in particular 20% to 30% by weight, of fillers, and optionally further constituents.

A preferred polyurethane composition comprises a second component B comprising 80% to 100% by weight of polyisocyanate I.

It is advantageous if the first and second components are formulated so that their mixing ratio in parts by weight is in the range from 10:1 to 1:10.

In the mixed polyurethane composition, the ratio before curing between the number of isocyanate groups and the number of isocyanate-reactive groups, especially hydroxyl groups, is in the range from 0.9:1-1.2:1, preferably 1.0:1-1.1:1.

The polyurethane composition, directly after mixing of components A and B, is free-flowing, preferably self-leveling, at 23° C. This means that it can be used as casting compound and can fill cavities. It is possible and may be advisable for the composition to be slightly thixotropic. In some preferred embodiments, the composition is self-leveling after mixing.

The polyurethane composition, directly after mixing of components A and B, has a viscosity, measured at 20° C. on a plate-plate viscometer with plate separation 1 mm and plate diameter 25 mm, of <5000 Pa·s, preferably <4000 Pa·s, at a shear rate of $0.01$ $s^{-1}$, and of <500 Pa·s, preferably <200 Pa·s, at a shear rate of 1 $s^{-1}$, and of <50 Pa·s, preferably <30 Pa·s, at a shear rate of 10 $s^{-1}$.

The viscosity can be adjusted by routine tests via formulation measures, for example the selection of the polyols and/or fillers and the use of low-viscosity additions such as plasticizers.

The two components are produced separately and preferably with the exclusion of moisture. The two components are typically each stored in a separate container. The further constituents of the polyurethane composition may be present as a constituent of the first or second component, with further constituents that are reactive toward isocyanate groups preferably being a constituent of the first component. A suitable container for storage of the respective component is especially a vat, a hobbock, a bag, a bucket, a can, a cartridge or a tube. The components are both storage-stable, meaning that they can be stored prior to use for several months up to one year or longer, without any change in their respective properties to a degree of relevance to their use.

The two components are stored separately from one another prior to the mixing of the composition and are only mixed with one another on or immediately prior to use. They are advantageously present in a package consisting of two separate chambers.

In a further aspect, the invention comprises a pack consisting of a package having two separate chambers which respectively contain the first component and the second component of the composition.

The mixing is typically effected via static mixers or with the aid of dynamic mixers. In the mixing, it should be ensured that the two components are mixed with maximum homogeneity. If the two components are mixed incompletely, local deviations from the advantageous mixing ratio will occur, which can result in a deterioration in the mechanical properties.

On contact of the first component with the second component, after the latency period of the catalyst resulting from the reaction with the thiols of the compound T, the curing commences through chemical reaction. This involves reaction of the hydroxyl groups and any other substances present that are reactive toward isocyanate groups with the isocyanate groups. Excess isocyanate groups react predominantly with moisture. As a result of these reactions, the polyurethane composition cures to give a solid material. This process is also referred to as crosslinking.

The invention thus also further provides a cured polyurethane composition obtained from the curing of the polyurethane composition as described in the present document.

The polyurethane composition described is characterized by high strength and elasticity that is highly constant over a wide temperature range from −35° C. to 85° C. and by good, largely temperature-independent adhesion properties. On account of these properties, it is very particularly suitable as casting compound which is used outdoors at ambient temperatures.

The polyurethane composition described is thus advantageously usable as casting compound, especially as casting compound for the filling of gaps and joins, for repair purposes, as ballast compensation compound or for the protection of electronic components.

The polyurethane composition is further preferably used as casting compound, especially as electrical potting compound. In a further aspect, the invention therefore encompasses the use of a two-component polyurethane composition as a potting compound, in particular as an electrical potting compound.

In a further aspect, the invention therefore encompasses a method of filling cavities, joins and gaps in a substrate, comprising the steps of
 a) mixing the first component A and the second component B of a two-component polyurethane composition as described above,
 b) pouring the mixed polyurethane composition into the cavity, join or gap to be filled in the substrate,
 c) curing the polyurethane composition in the cavity, join or gap.

In these processes for bonding or for filling cavities, joins and gaps, suitable substrates are in particular
 glass, glass ceramic, glass mineral fiber mats;
 metals and alloys such as aluminum, iron, steel and nonferrous metals, and also surface-finished metals and alloys such as galvanized or chromed metals;
 coated and painted substrates, such as powder-coated metals or alloys and painted sheet metal;
 plastics, such as polyvinyl chloride (rigid and flexible PVC), acrylonitrile-butadiene-styrene copolymers (ABS), polycarbonate (PC), polyamide (PA), poly(methyl methacrylate) (PMMA), polyester, epoxy resins, especially epoxy-based thermosets, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), where the plastics may preferably have been surface-treated by means of plasma, corona or flames;
 fiber-reinforced plastics, such as carbon fiber-reinforced plastics (CFP), glass fiber-reinforced plastics (GFP) and sheet-molding compounds (SMC);
 wood, woodbase materials bonded with resins, for example phenolic, melamine or epoxy resins, resin-textile composites and further polymer composites; and
 concrete, asphalt, mortar, brick, plaster, and natural stone such as granite, limestone, sandstone or marble.

Particularly suitable substrates are concrete, asphalt, metal, plastic, wood, glass, ceramic and fiber-reinforced plastics, in particular metal and fiber-reinforced plastics.

In a preferred embodiment of this method, the curing of the mixed polyurethane composition is preceded by partial or complete immersion of a further article into the as yet uncured composition or surface contact of a further article with the as yet uncured composition, such that the further article is at least partly cohesively bonded to the cured composition after the composition has cured.

As a result of this, this further article is anchored in or at least fixed to the composition after it has cured.

Such further articles may be made of any material, preferably of metal, plastic or wood, or of surface-coated materials of this kind, for example powder-coated metal. If these articles are immersed into the as yet uncured composition, it is usually not even necessary for the material of the article to develop adhesion to the polyurethane composition.

According to the geometry of the article, it is thus possible to achieve mechanical anchoring, irrespective of the material of the article, by virtue of the cured composition filling recesses and cavities in the article. In this way, it is also possible to firmly bond materials that are not normally bondable, such as polytetrafluoroethylene (PTFE) or other plastics having similarly low-energy surfaces, to the polyurethane composition.

Such further articles may have any shape and geometry. For example, it is possible in this way to anchor articles in the cured composition, or to provide the cured composition with functional elements such as handles, reinforcements or screws. It is also possible to produce composites in this way, for example polyurethane compositions reinforced by braids, fibers or lattice.

A particular embodiment of this method with a further element is executed in a cavity that does not develop any adhesion to the polyurethane composition to be cured. The result of this is that, after curing, the cured composition can simply be removed from the cavity. In this embodiment, the cavity thus serves especially as a reusable casting mold. This means that it is possible, for example, to provide this further article as described above with a structure made of cured polyurethane composition that has been adhesively secured to the surface of the article. This constitutes a method of bonding a mold made of polyurethane composition of the invention on an element.

The casting mold itself permits the fixing of an exact, three-dimensional shape of the cured composition. Suitable materials for a nonadhesive casting mold are very low-energy plastics such as polyethylene, polypropylene and fluorinated polyolefins, for example PTFE, and casting molds that have been treated or coated, for example, with loose powders, flours, low-energy polymers or silicone oils, which form an interface to the surface of the casting mold.

Thus, a preferred embodiment of the abovementioned method is characterized in that the surface of the cavity, join or gap consists of a material that does not develop any adhesion to the curing or cured polyurethane composition. "Adhesion" in this embodiment refers to an adhesion force sufficiently strong that the cured polyurethane composition cannot be removed from the cavity without residue.

In a further aspect, the invention therefore also encompasses a filled article that has been filled by the method described above.

EXAMPLES

TABLE 1

| Substances used | |
| --- | --- |
| Voranol CP 4755 | Voranol ® CP 4755 (Dow Chemical); polyether triol, CAS No. 9082-00-2; MW: 5000 g/mol; OH value: 35 mg KOH/g |
| Acclaim 4200 | Acclaim ® Polyol 4200 (Covestro); polyether diol, $M_n$: approx. 4000 g/mol; OH number: 26.5-29.5 mg KOH/g |
| Ethacure | Ethacure ® 300 (Albemarle); 6-methyl-2,4-bis(methylthio)phenylene-1,3-diamine (amine crosslinker) |
| Pentane-1,5-diol | (Sigma Aldrich) |
| DIDP | Jayflex ® DIDP (ExxonMobil Chemical); diisodecyl phthalate (plasticizer) |
| Thiocure GDMP | Thiocure ® GDMP (Bruno Bock Thiochemicals); glycol di(3-mercaptopropionate) |
| Desmodur CD-L | Desmodur ® CD-L (Covestro); modified diphenylmethane 4,4'-diisocyanate (MDI); NCO content: 29.5% by weight |
| Monarch 570 | Monarch ® 570 (Cabot Corp.); carbon black (filler) |
| Omya BL | Omya ® BL (Omya); ground, natural chalk (filler) |
| Bi cat. (2.68 mmol Bi/g) | 35% by weight of Coscat 83 (organobismuth catalyst; Coscat ® 83 (Vertellus Specialties Inc.)) in plasticizer containing 1 molar equivalent of 8-hydroxyquinoline (based on Bi) |
| Sn cat. | dibutyltin dilaurate (Sigma Aldrich) |

Production of Polyurethane Compositions

For each composition, the ingredients of the first component A specified in table 2 were processed in the amounts specified (in parts by weight or % by weight), by means of a vacuum dissolver with the exclusion of moisture, to give a homogeneous paste and stored. The ingredients of the second component B specified in the tables were likewise processed and stored. The two components were then processed for 30 seconds, by means of a SpeedMixer® (DAC 150 FV, Hauschild), into a homogeneous paste, which was immediately tested as follows:

For determination of the mechanical properties, the compositions were cured at 23° C. and 50% RH for 7 days, and modulus of elasticity ("MoE") in the range from 0.5% to 5% elongation and 0.05% to 0.25% elongation, tensile strength and elongation at break of the test specimens thus produced were measured according to DIN EN ISO 527 on a Zwick Z020 tensile tester at 23° C. and 50% RH and a testing speed of 10 mm/min.

Shore A hardness was determined to DIN 53505 on test specimens having a layer thickness of 6 mm that had been cured at 23° C. and 50% relative humidity. The exact storage time (curing time) before the respective measurement is specified in table 3.

Tg values (glass transition temperatures) were determined using a Rheoplus MCR 302 instrument from Anton Paar on the basis of DMA measurements on cuboidal samples (43.515 mm×10 mm×1.49 mm), which were cured for 7 days under standard climatic conditions ("SCC"; 23° C., 50% relative humidity "RH"). The measurement conditions were: measurement in shear mode, excitation frequency 1 Hz, and heating rate of 5 K/min. The samples were cooled to −100° C. and heated to 100° C. with determination of the complex shear modulus G* [MPa], by reading off a maximum in the curve for the loss angle "tan δ" as the Tg value.

Pot life was measured in a viscometer as the time until the viscosity was 500 Pa·s after the two components had been mixed. Viscosity was measured on an MCR 302 parallel-plate rheometer (Anton Paar) with a plate diameter of 25 mm and a plate distance of 1 mm at a frequency of $0.1\ s^{-1}$ and a temperature of 20° C. This was done by first mixing the two components for 30 sec in a Speedmixer (Hauschild) and immediately applying the mixture to the plates for the measurement.

Viscosity was measured on an MCR 302 parallel-plate rheometer (Anton Paar) with a plate diameter of 25 mm and a plate distance of 1 mm at a frequency of $0.01\ s^{-1}$, $1\ s^{-1}$ and $10\ s^{-1}$ and a temperature of 20° C. This was done by first mixing the two components for 30 sec in a Speedmixer (Hauschild) and immediately applying the mixture to the plates for the measurement.

TABLE 2

Example compositions produced

| Example | C-1 (Ref.) | C-2 |
|---|---|---|
| First component A (amounts in parts by weight) | | |
| Voranol CP 4755 | 27 | 28 |
| Acclaim 4200 | 27 | 28 |
| Ethacure | 7 | — |
| Pentane-1,5-diol | — | 4.5 |
| Omya BL | 20.95 | 28 |
| Monarch 570 | 1 | 1 |
| DIDP | 17 | 8.7 |
| Bi cat. (2.68 mmol Bi/g) | — | 0.1 |
| Sn cat. | 0.05 | — |
| Thiocure GDMP | — | 1.7 |
| TOTAL | 100 | 100 |
| Second component B (amounts in parts by weight) | | |
| Desmodur CD-L | 100 | 100 |
| TOTAL | 100 | 100 |
| Mixture of A and B | | |
| Mixing ratio (volume) of A:B | 100:15 | 100:15 |
| Molar ratio of SH:Bi | — | 53:1 |

TABLE 3

Measurement values for the example compositions

| Measurement | C-1 (Ref.) | C-2 |
|---|---|---|
| Tg [° C.] | −57.64 | −36.71 |
| Pot life [min] | 10 | 55 |
| Shore A (after 1 h) | 31 | 49 |
| Shore A (after 2 h) | 36 | 54 |
| Shore A (after 4 h) | 62 | 57 |
| Shore A (after 24 h) | 67 | 60 |
| Shore A (after 7 d) | 70 | 60 |
| Tensile strength [MPa] | 2.53 | 2.42 |
| Elongation at break [%] | 105.8 | 139.1 |
| MoE 0.05-0.25% [MPa] | 12.5 | 11.5 |
| MoE 0.5-5% [MPa] | 9.2 | 8.6 |
| Viscosity (freshly mixed) [Pa·s] ($0.01\ s^{-1}$) | 45.8 | 3070 |
| Viscosity (freshly mixed) [Pa·s] ($1\ s^{-1}$) | 15 | 103 |
| Viscosity (freshly mixed) [Pa·s] ($10\ s^{-1}$) | 8.23 | 21.1 |

The results in table 3 show that the mechanical values of the two compositions after complete curing and the Tg values are comparable. Distinct differences arise in the pot life, which is much higher in the inventive example than in the reference example. In addition, the inventive example reaches the final values for Shore A hardness much more quickly. The viscosities of the two compositions show suitability as casting compound.

TABLE 4

Evolution of viscosity of the example compositions ($0.1\ s^{-1}$)

| Time (min after mixing) | C-1 (Ref.) (viscosity in Pa·s) | C-2 (viscosity in Pa·s) |
|---|---|---|
| 1 | 24.67 | 130.2 |
| 5 | 96.53 | 146 |
| 10 | 493.6 | 154 |
| 20 | 4971 | 167 |
| 30 | 14610 | 186 |
| 40 | 26 560 | 217 |
| 50 | 39 220 | 292.6 |
| 60 | 51 830 | 8 680 |
| 70 | 64 070 | 107 700 |
| 80 | 75 770 | 213 900 |
| 90 | 86 880 | 284 400 |

Table 4 compares the evolution of viscosity (shear rate $0.1\ s^{-1}$) over time for the two compositions. It is clearly apparent that the inventive example has almost constantly low viscosity over a long period of time (pot life), but then very rapidly gains viscosity when the curing reaction begins to start up. The comparative example, by contrast, shows a viscosity that rises gradually from the start, but is then overtaken by the inventive example. Thus, in the inventive example, processability during the pot life is improved (constant viscosity), but curing is then very much more rapid than in the reference example.

The invention claimed is:

1. A casting compound comprising a polyurethane composition consisting of a first component A and a second component B;

the first component A comprising:
- at least one polyol A1 having an OH functionality in the range from 1.5 to 4 and a mean molecular weight (number average) $M_n$, measured by means of GPC against polystyrene, in the range from 250 to 15 000 g/mol, and
- at least one diol A2 having two hydroxyl groups joined via a C2 to C9 carbon chain, and
- at least one compound T having at least one thiol group; and the second component B comprising:
- at least one polyisocyanate I that is a form of diphenylmethane 4,4'-, 2,4'-, or 2,2'-diisocyanate (MDI) that is liquid at room temperature and any mixtures of thereof in a form of polymeric MDI or MDI containing proportions of oligomers or derivatives;

wherein:
one of the first component A and the second component B additionally comprises at least one metal catalyst K for the reaction of hydroxyl groups and isocyanate groups that is able to form thio complexes;
the molar ratio of all the thiol groups in the at least one compound T to all metal atoms in the at least one metal catalyst K is between 1:1 and 250:1;
the molar ratio of all NCO groups in the polyisocyanates I to all OH groups in the polyols A1 and A2 is in a range of 0.9:1-1.2:1; and
the polyurethane composition, directly after mixing of components A and B at 23° C., is free-flowing, and has a viscosity, measured at 20° C. on a plate-plate viscometer with plate separation 1 mm and plate diameter 25 mm, of <5000 Pa·s at a shear rate of 0.01 s$^{-1}$, of <500 Pa·s at a shear rate of 1 s$^{-1}$, and of <50 Pa·s at a shear rate of 10 s$^{-1}$.

2. The casting compound as claimed in claim 1, wherein the metal catalyst K comprises a bismuth (III) compound.

3. The casting compound as claimed in claim 1, wherein the diol A2 is selected from the group consisting of butane-1,3-diol, butane-1,4-diol, butane-2,3-diol, 2-methylpropane-1,3-diol, pentane-1,2-diol, pentane-2,4-diol, 2-methylbutane-1,4-diol, 2,2-dimethylpropane-1,3-diol, hexane-1,2-diol, 3-methylpentane-1,5-diol, octane-1,2-diol, octane-3,6-diol, 2-ethylhexane-1,3-diol, 2,2,4-trimethylpentane-1,3-diol, 2-butyl-2-ethylpropane-1,3-diol, 2,7-dimethyloctane-3,6-diol, cyclohexane-1,4-diol, cyclohexane-1,3-dimethanol and cyclohexane-1,4-dimethanol.

4. The casting compound as claimed in claim 1, wherein the at least one compound T comprises a polythiol compound having 2 to 6 thiol groups, or a mercaptosilane.

5. The casting compound as claimed in claim 4, wherein the at least one compound T is selected from the group consisting of ethylene glycol di(3-mercaptopropionate), ethylene glycol dimercaptoacetate, dipentaerythritol hexa (3-mercaptopropionate), and 3-mercaptopropyltrimethoxysilane.

6. The casting compound as claimed in claim 1, wherein the molar ratio of all the thiol groups in the at least one compound T to all metal atoms in the at least one metal catalyst K is between 5:1 and 100:1.

7. The casting compound as claimed in claim 1, wherein the metal catalyst K is present in the first component A.

8. The casting compound as claimed in claim 1, wherein the polyol A1 comprises a polyether polyol and/or a polybutadiene polyol.

9. The casting compound as claimed in claim 1, wherein the second component B comprises a polyurethane polymer containing isocyanate groups.

10. The casting compound as claimed in claim 1, wherein the mixing ratio in parts by weight between the first and second components is in the range from 10:1 to 1:1.

11. A method of filling cavities, joins and gaps in a substrate, comprising:
a) mixing the first component A and second component B of the two-component polyurethane composition of the casting compound as claimed in claim 1,
b) pouring the mixed polyurethane composition into the cavity, join or gap to be filled in the substrate,
c) curing the polyurethane composition in the cavity, join or gap.

12. The method as claimed in claim 11, wherein the curing of the mixed polyurethane composition is preceded by partial or complete immersion of a further article into the as yet uncured composition or surface contact of a further article with the as yet uncured composition, such that the further article is at least partly cohesively bonded to the cured composition after the composition has cured.

13. The method as claimed in claim 11, wherein the surface of the cavity, join or gap consists of a material that does not develop any adhesion to the curing or cured polyurethane composition.

14. The casting compound according to claim 1, wherein the polyurethane composition comprises less than 0.5% by weight of carboxylic acids based on a total weight of the polyurethane composition.

15. The casting compound according to claim 1, wherein the polyurethane composition comprises less than 0.1% by weight of carboxylic acids based on a total weight of the polyurethane composition.

* * * * *